(12) United States Patent
Watanabe (10) Patent No.: US 6,613,472 B1
(45) Date of Patent: Sep. 2, 2003

(54) BATTERY COOLING STRUCTURE (75) Inventor: Osamu Watanabe, Kanagawa (JP)

(73) Assignee: Tokyo R & D Co., Ltd., Tokyo (JP)

( * ) Notice: Subject to any disclaimer, the term of this patent is extended or adjusted under 35 U.S.C. 154(b) by 0 days.

(21) Appl. No.: 09/959,797

(22) PCT Filed: Aug. 24, 2000

(86) PCT No.: PCT/JP00/05679

§ 371 (c)(1),
(2), (4) Date: Nov. 7, 2001

(87) PCT Pub. No.: WO01/17055

PCT Pub. Date: Mar. 8, 2001

(30) Foreign Application Priority Data

Aug. 27, 1999 (JP) .............................. 11-241689
Feb. 1, 2000 (JP) ....................................... 2000-023791

(51) Int. Cl.[7] ............................................. H01M 10/50
(52) U.S. Cl. .......................... 429/120; 429/62; 429/112
(58) Field of Search ............................ 429/62, 112, 120

(56) References Cited

U.S. PATENT DOCUMENTS 5,432,026 A 7/1995 Sahm et al. ................. 429/120

FOREIGN PATENT DOCUMENTS

| DE | 43 09 621 A1 | 9/1994 | .......... H01M/10/50 |
| EP | 0 616 913 A2 | 9/1994 | .......... H01M/10/50 |
| JP | 10-121960 | 5/1998 | .............. F01P/5/06 |
| JP | 11-67178 * | 3/1999 | ............. H01M/2/10 |

* cited by examiner

Primary Examiner—Carol Chaney
Assistant Examiner—Dah-Wei D. Yuan
(74) Attorney, Agent, or Firm—Sughrue Mion, PLLC (57) ABSTRACT A battery cooling structure for cooling modules (battery elements) M by means of open air, which are accommodated within a case 1, has the following arrangement: First, a space within the case 1 is partitioned, and a first space 8b and a second space 8a adjacent to each other and interposing the modules M therebetween are formed. And, on a surface of the case 1, which corresponds to one end side of the modules M, a first introduction opening 9b is formed, and on a surface of the case 1, which corresponds to the other end side of the modules M, a first discharge opening 10b is formed for discharging open air introduced into the first space 8b from this first introduction opening 9b after this open air has passed the inside of the first space 8b. On the other hand, on the surface of the case 1, which corresponds to the other end side of the modules M, a second introduction opening 9a is formed. Further, on the surface of the case 1, which corresponds to one end side of the modules M, a second discharge opening 10a is formed for discharging open air introduced into the second space 8a from this second introduction opening 9a after this open air has passed the inside of the second space 8a.

11 Claims, 8 Drawing Sheets

BATTERY COOLING STRUCTURE

TECHNICAL FIELD

The present invention relates to a cooling structure for battery that is loaded in motor type vehicles such as a motor two-wheel vehicle.

BACKGROUND TECHNOLOGY

In recent years, research and development of motor type vehicles irrespective of a two-wheel vehicle or a four-wheel vehicle are actively conducted for coping with an environment issue. Especially as for the four-wheel vehicle advantageous from a space aspect, there is an example that is already being put to practical use.

By the way, in such motor type vehicles, especially a motor two-wheel vehicle out of them, in which it is severely required to make a power supply thereof compact, is loaded with a high-performance battery such as a nickel-hydrogen battery, a nickel-cadmium battery and lithium ion battery. More particularly, first a module is obtained by connecting several cells to each other in series. Next, a predetermined number of these modules are closely accommodated within a hard case. And, finally, these modules are connected to each other in series to bring the above-described battery to completion. However, the battery having such a form has the following tasks:

A battery generates heat in charge and discharge regardless of its kind. This is also applied to the above-described battery constructed of a number of cells. However, even though heat values of the respective cells are equal to each other, a large temperature difference between the cells sometimes occurs. For example, a cell positioned on a side of a center of the case is apt to have heat more than a cell positioned on a side of a wall surface of the case. As a result, a considerable temperature difference occurs between both cells. And, this temperature difference makes charge condition of the cells non-uniform. In other words, the temperature difference between the cells causes performance reduction of the battery.

In addition, in order to suppress unnecessary temperature increase, there is a structure in which open air is blown upon a battery. Certainly, in this case, average temperature of the battery decreases. However, temperature of the open air introduced into the case gradually increases until it is discharged from the case. Accordingly, a cooling ratio by means of the open air never becomes uniform, and the above-described tasks, namely, the task that the performance of the battery is reduced due to the temperature difference between the cells cannot be substantially solved.

DISCLOSURE OF THE INVENTION

The objective of the present invention is to solve the above-described tasks.

Especially, the objective of the present invention is to provide a battery cooling structure capable of cooling a battery so that temperature of the whole thereof becomes uniform.

The above-described objective of the present invention is accomplished by a battery cooling structure for cooling a battery by open air, which is accommodated within a case, characterized in that the structure has:

said case;

first space and second space formed by partitioning space within said case, and adjacent to each other and interposing said battery therebetween;

a first introduction opening formed on a surface of said case, which is corresponding to a side of one end of said battery;

a first discharge opening formed on a surface of said case, which is corresponding to a side of the other end of said battery, for discharging said open air introduced into said first space from said first introduction opening after said open air has passed an inside of said first space;

a second introduction opening formed on a surface of said case, which is corresponding to a side of the other end of said battery; and a second discharge opening formed on a surface of said case, which is corresponding to a side of one end of said battery, for discharging said open air introduced into said second space from said second introduction opening after said open air has passed an inside of said second space, and a plurality of said batteries are accommodated in said cases in parallel condition, and a plurality of unit cooling systems consisting of said first space and said second space adjacent to each other and interposing said batteries therebetween are provided in said cases, and further, said adjacent unit cooling systems are constructed so as to mutually share said first space or said second space.

In addition, it is preferable that the battery cooling structure of the present invention has two of said case, and by making said cases adjacent to each other, and further, connecting said first discharge opening in one of said cases to said second introduction opening in the other of said cases, and by connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases. Thereby, high space efficiency can be realized, and at the same time, capacity of the battery can be made larger.

Moreover, the objective of the present invention is accomplished by a battery cooling structure for cooling a battery by open air, which is accommodated within a case, characterized in that space within said case is partitioned into first space and second space adjacent to each other and interposing said battery therebetween, and the structure is constructed so that open air introduced into said first space from a first introduction opening formed on a surface of said case, which is corresponding to a side of one end of said battery, is discharged from a first discharge opening formed on a surface of said case, which is corresponding to a side of the other end of said battery, after the open air has passed an inside of said first space, and open air introduced into said second space from a second introduction opening formed on a surface of said case, which is corresponding to a side of the other end of said battery, is discharged from a second discharge opening formed on a surface of said case, which is corresponding to a side of one end of said battery, after the open air has passed an inside of said second space, and further, a plurality of said batteries are accommodated in said cases in parallel condition, and a plurality of unit cooling systems consisting of said first space and said second space adjacent to each other and interposing said batteries therebetween are provided in said cases, and further, said adjacent unit cooling systems are constructed so as to mutually share said first space or said second space.

In addition, also in the battery cooling structure of the present invention, it is preferable that the structure has two of said case, and by making said cases adjacent to each other, and further, connecting said first discharge opening in one of said cases to said second introduction opening in the other of said cases, and by connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases. Thereby, high space efficiency can be realized, and at the same time, capacity of the battery can be made larger.

Also, it is preferable that the battery cooling structure of the present invention further has a partition plate, and said partition plate is used together with said battery for a partition of the space within said case, and further said partition plate is constructed so as to support said battery. In this manner, compared with a case where a member for partition use and a member for supporting a battery are made of members separate from each other, it is possible to reduce the number of components and an assembly load. As a result, cost reduction can be realized.

Further, in the battery cooling structure of the present invention, it is preferable that, on upper and lower outer surfaces of said cases, convex sections for receiving a part of said battery to be placed within said cases are formed, and said cases are piled up and down so that said convex sections formed on a side of the other of said cases are positioned within a concave section between said convex sections formed on a side of one of said cases. In other words, it is preferable that said cases are piled up and down alternately. In this manner, in piling the cases up and down, it becomes possible to save dimensions of the obtained piled body, especially a height dimension thereof. Also, positional stability of the batteries within the cases is drastically improved.

And further, in the battery cooling structure of the present invention, it is preferable that the structure further has a duct in which means for sending open air under pressure is provided, and said first introduction opening is connected to said duct, and an end section opening on a side where open air is introduced in said duct, and said second discharge opening formed in said case are connected to each other by a tube body for circulation, and said tube body for circulation is constructed so as to, if necessary, eject discharged air from said second discharge opening into the atmosphere and supply open air to said duct. By adopting such an arrangement, the battery cooling structure of the present invention effects the following advantages especially during cold, namely under situation where the batteries are cooled:

As known well, the batteries cannot exhibit their desired performance if their temperatures are too low. Accordingly, in using them, it is desirable that the temperatures of the batteries rapidly increase to an optimum value. For this, as described above, the discharged air from said second discharge opening may be supplied to the duct using the tube body for circulation. Namely, it may be internally circulated. In other words, since the temperature of the discharged air from this second discharge opening is higher than the atmosphere, it is possible to make the temperatures of the batteries increase rapidly rather than introduction of fresh open air.

Furthermore, by doing this, it is possible to make the temperatures of the batteries increase rapidly without generating a temperature difference between the batteries. As a result, it becomes possible to make the batteries exhibit desired performance extremely rapidly.

In addition, after the batteries reach an optimum temperature, of course, the discharged air from the second discharge opening becomes to be ejected into the atmosphere. Then, instead of this, low temperature fresh open air is supplied.

In the light of the above points, the above-described objective of the present invention is accomplished by a battery cooling structure for cooling a battery by open air, which is accommodated within a case and constructed by connecting a plurality of cells to each other in series, characterized in that the structure has:

said case;

first space and second space formed by partitioning space within said case, and adjacent to each other and interposing said battery therebetween;

a first introduction opening formed on a surface of said case, which is corresponding to a side of one end of said battery;

a first discharge opening formed on a surface of said case, which is corresponding to a side of the other end of said battery, for discharging said open air introduced into said first space from said first introduction opening after said open air has passed an inside of said first space;

a second introduction opening formed on a surface of said case, which is corresponding to a side of the other end of said battery; and a second discharge opening formed on a surface of said case, which is corresponding to a side of one end of said battery, for discharging said open air introduced into said second space from said second introduction opening after said open air has passed an inside of said second space, and there are two of said case with the cases adjacent to each other, and further, by connecting said first discharge opening in one of said cases to said second introduction opening in the other of said cases, and connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases, and a plurality of said batteries are accommodated in said cases in parallel condition, and a plurality of unit cooling systems consisting of said first space and said second space adjacent to each other and interposing said batteries therebetween are provided in said cases, and said adjacent unit cooling systems are constructed so as to mutually share said first space or said second space, and further, a spacer, and a pair of said batteries piled up and down via said spacer are used in a partition of the space within said cases, and said batteries are supported within said cases with the batteries interposed between inner surfaces of said cases and said spacer, and on upper and lower outer surfaces of said cases, convex sections for receiving a part of said batteries to be placed within said cases are formed, and said cases are piled up and down so that said convex sections formed on a side of the other of said cases are positioned within a concave section between said convex sections formed on a side of one of said cases.

Now, in case of adopting the above structure, open air is introduced into the first space and the second space adjacent to each other and interposing the battery therebetween in directions opposite to each other, respectively. And, this introduced open air cools the battery, and on the other hand, is gradually warmed up, and finally, is discharged in directions opposite to each other. By the way, between a flow distance of the open air introduced into the case and a temperature of the introduced open air at a position corresponding to the flow distance, basically a linear relationship is established. In other words, a temperature gradient along a flow path of the introduced open air is almost constant. And, these temperature gradients are completely reversed on a side of the first space and on a side of the second space. Accordingly, a total value of heat that is cooperatively absorbed by the open air introduced in directions opposite to each other from a part of the battery is always constant regardless of a distance from the open air introduction opening. Therefore, a high temperature part and a low temperature part do not occur in the battery. Especially for a battery constructed by connecting a plurality of cells to each other in series, a temperature difference between the cells does not occur. In other words, by adopting the battery cooling structure of the present invention, it becomes possible to cool the battery efficiently so as to make the temperature of the whole thereof uniform. Therefore, the task of the performance reduction of the battery due to the temperature difference does not occur.

EMBODIMENTS OF THE INVENTION

Below, a first embodiment of the present invention will be explained using FIG. 1 to FIG. 9.

Figure 1:
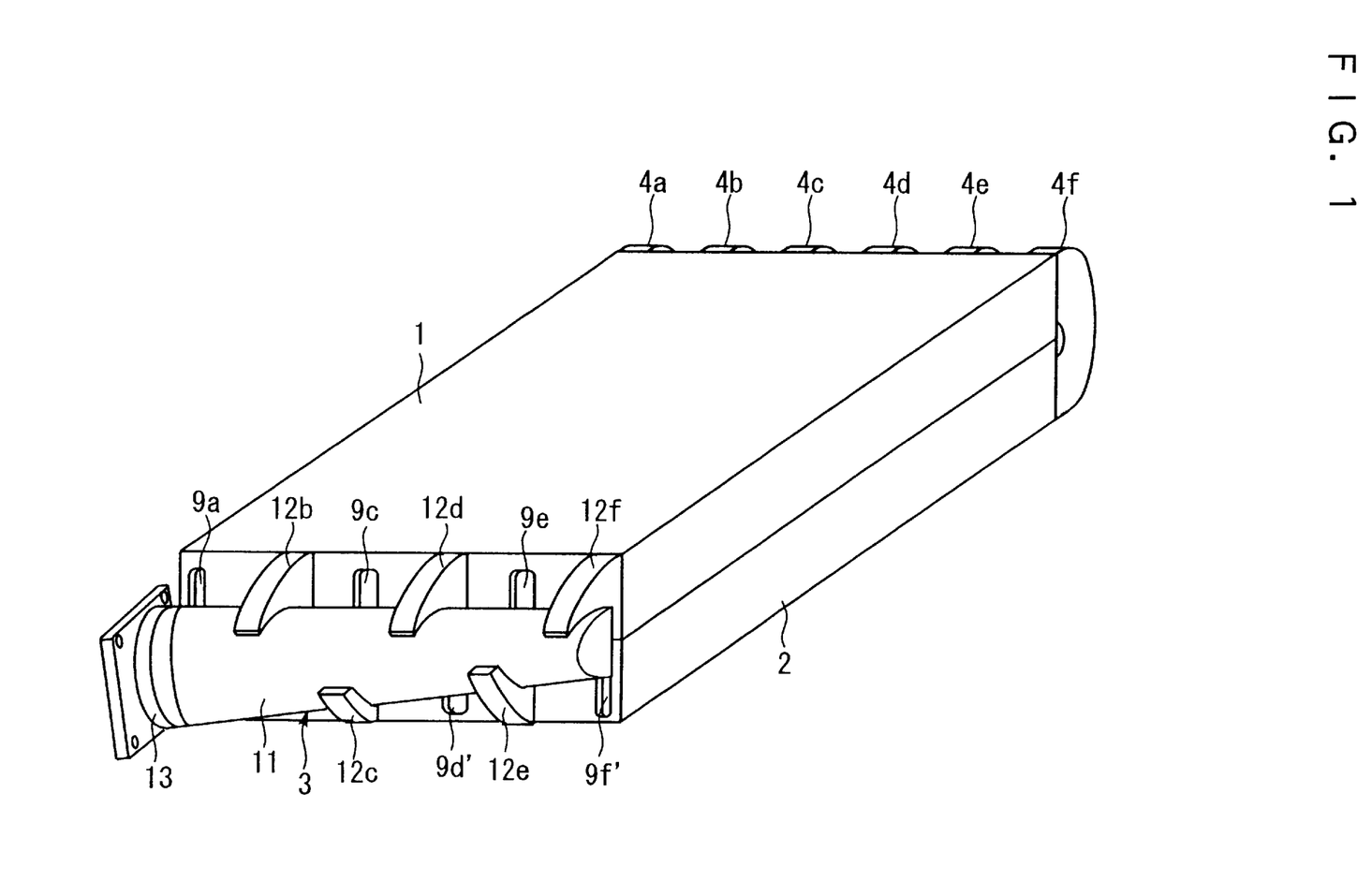
FIG. 1 is an appearance view of a battery unit in which a cooling structure related to a first embodiment of the present invention is adopted.
Figure 2:
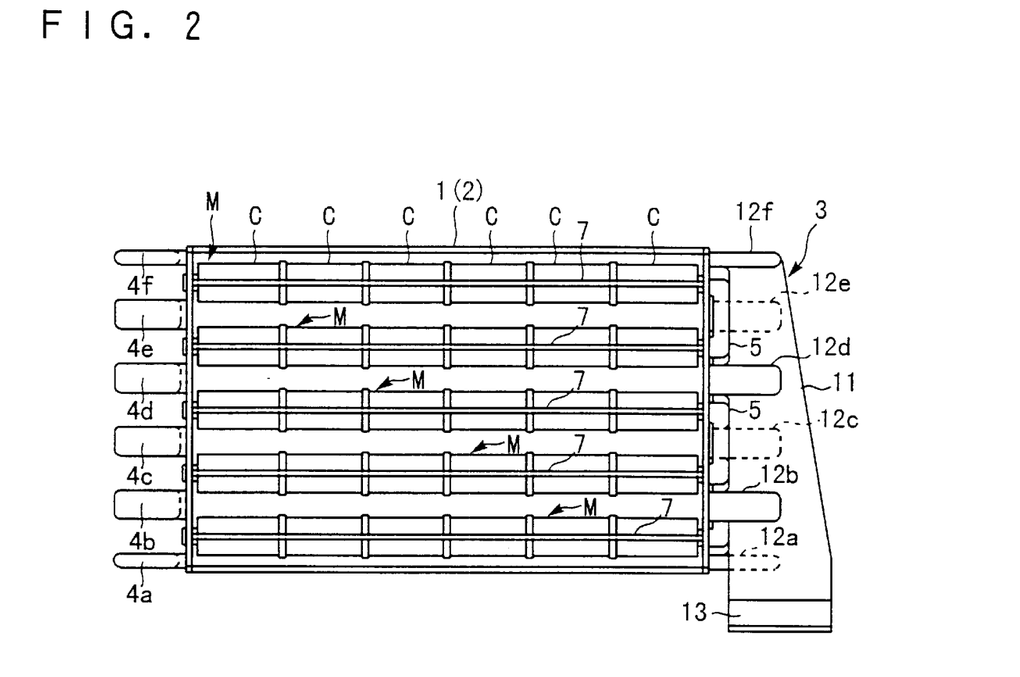
FIG. 2 is a plane view of the above-described battery unit with a roof plate omitted.
Figure 3:
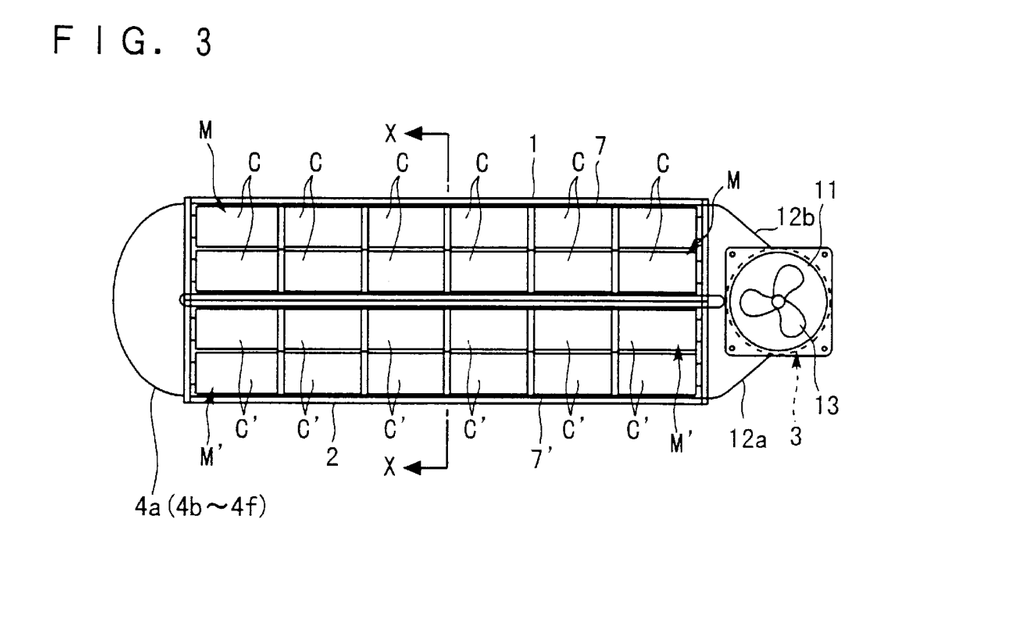
FIG. 3 is a front view of the above-described battery unit with a front plate omitted.
Figure 4:
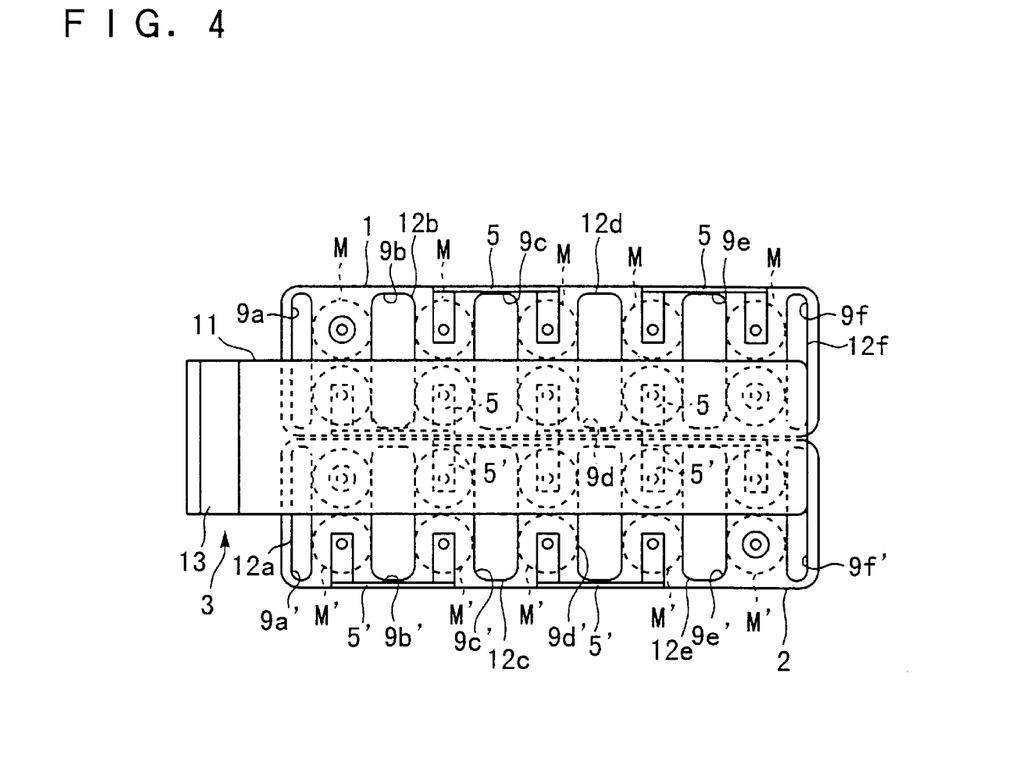
FIG. 4 is a right-hand side view of the above-described battery unit.
Figure 5:
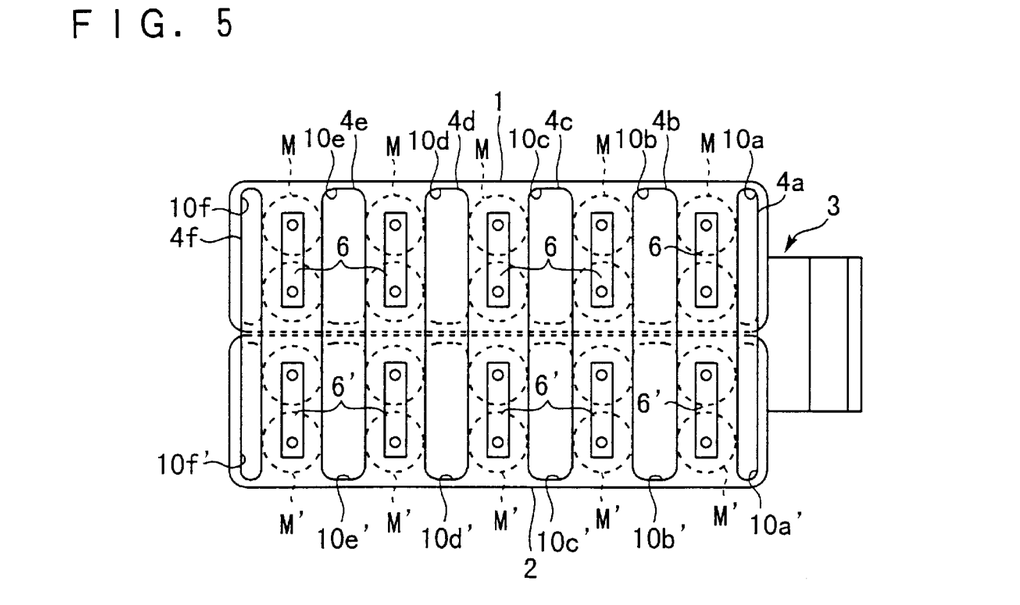
FIG. 5 is a left-hand side view of the above-described battery unit.
Figure 6:
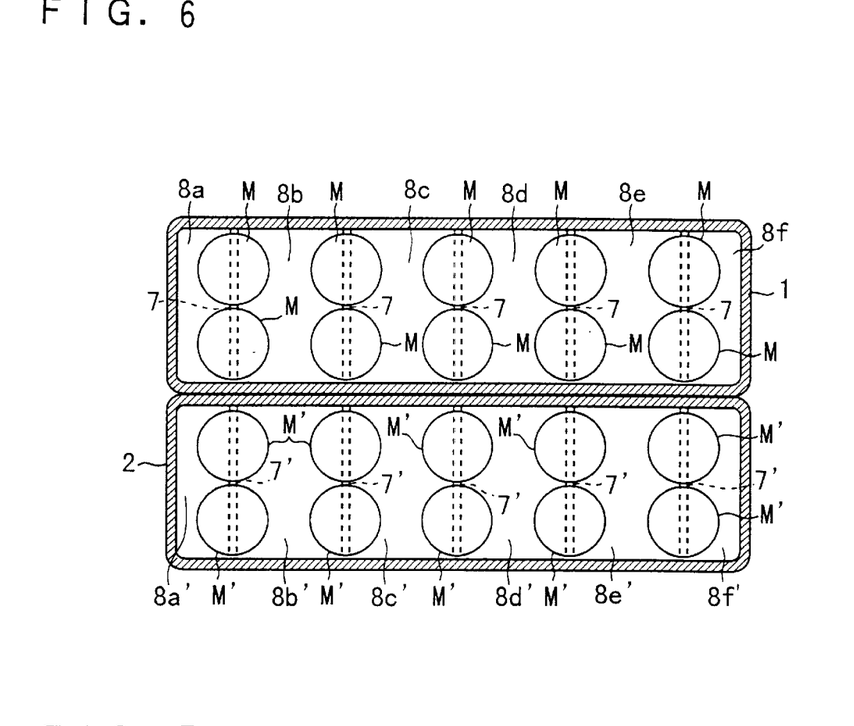
FIG. 6 is a transverse cross sectional view of the above-described battery unit, which is taken along an X—X line in FIG. 3.
Figure 7:
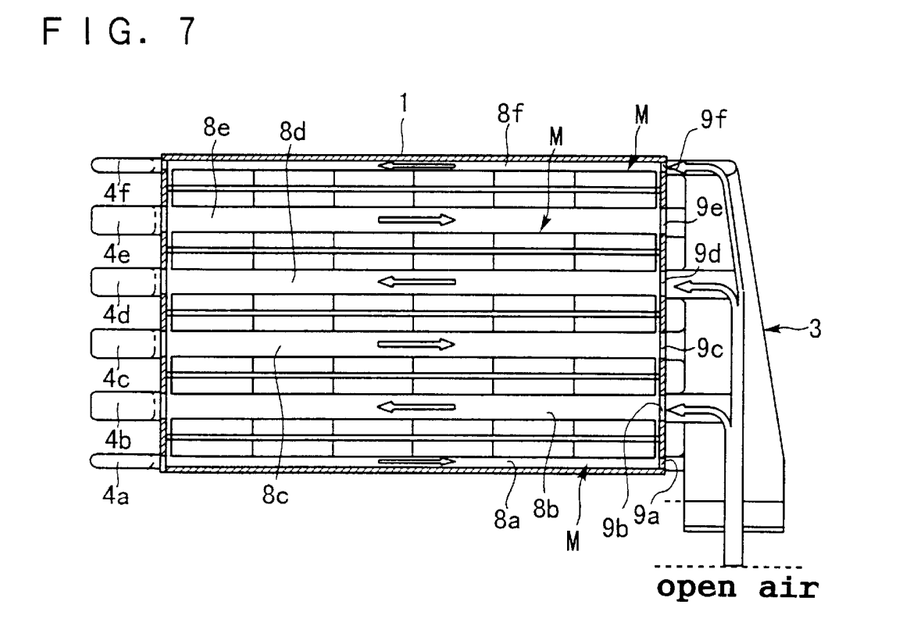
FIG. 7 is a plane view of the above-described battery unit with a roof plate omitted, which shows a flow situation of introduced open air.
Figure 8:
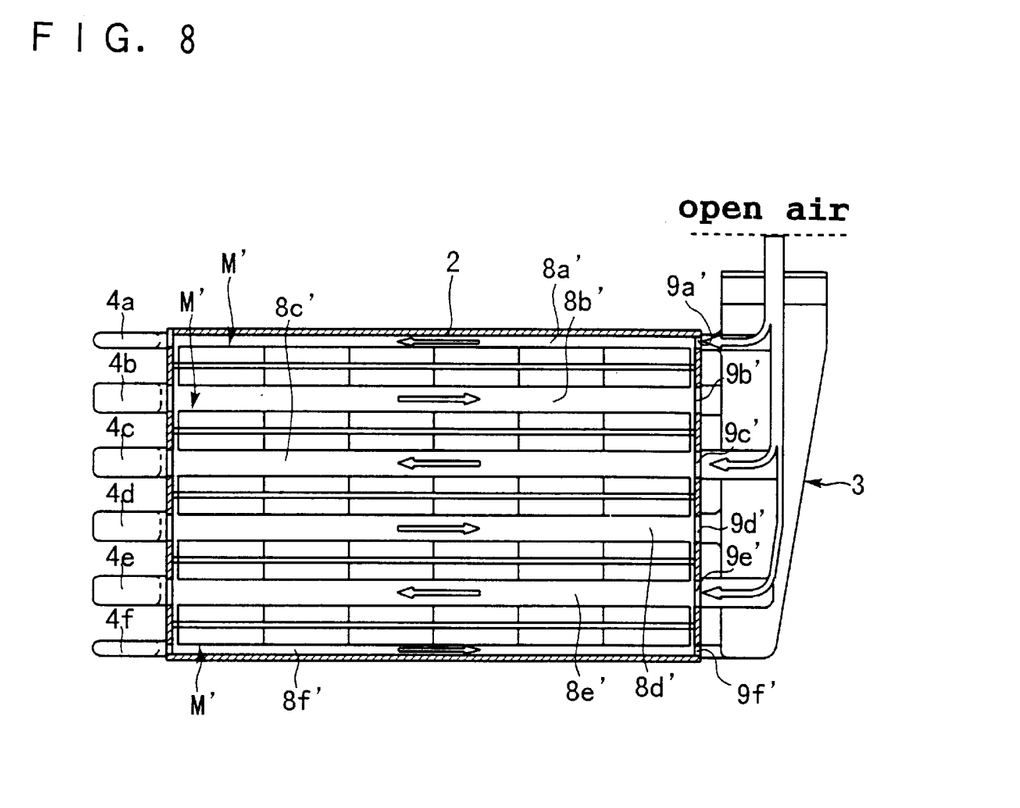
FIG. 8 is a plane view of the above-described battery unit with a bottom plate omitted, which shows a flow situation of introduced open air.
Figure 9:
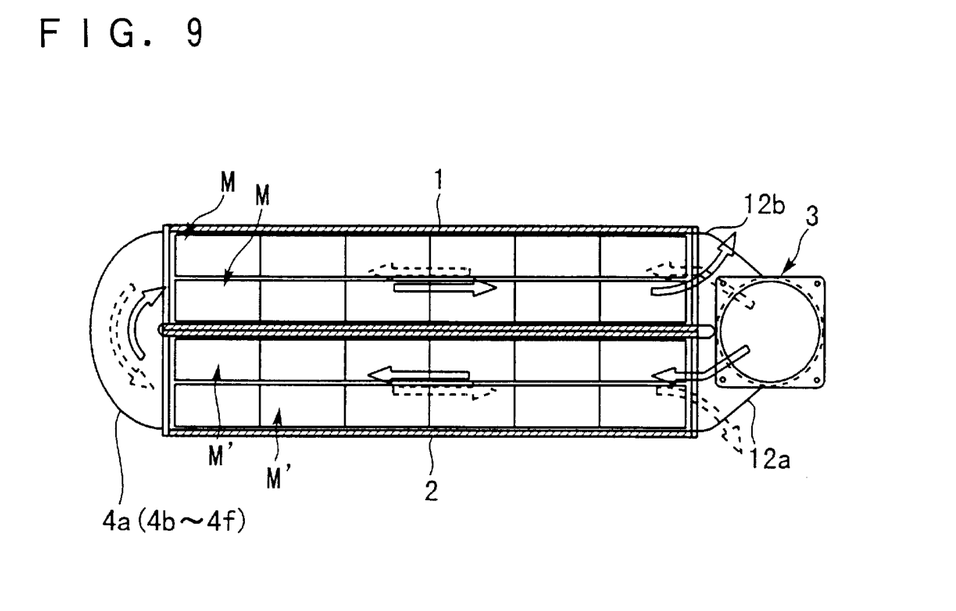
FIG. 9 is a front view of the above-described battery unit with a front plate omitted, which shows a flow situation of introduced open air.

In addition, FIG. 1 is an appearance view of a battery unit in which a cooling structure related to this embodiment of the present invention is adopted, FIG. 2 is a plane view of the same battery unit with a roof plate omitted, FIG. 3 is a front view of the same battery unit with a front plate omitted, FIG. 4 and FIG. 5 are a right-hand side view and a left-hand side view of the same battery unit, respectively, FIG. 6 is a transverse cross sectional view of the same battery unit, which is taken along an X—X line in FIG. 3, FIG. 7 is a plane view of the same battery unit with a roof plate omitted, which shows a flow situation of introduced open air, FIG. 8 is a plane view of the same battery unit with a bottom plate omitted, which shows a flow situation of introduced open air, and FIG. 9 is a front view of the same battery unit with a front plate omitted, which shows a flow situation of introduced open air.

The appearance of a battery unit in which a cooling structure (referred to as this cooling structure, hereinafter) in accordance with this embodiment is adopted is shown in FIG. 1.

Here, a vehicle (a motor two-wheel vehicle, for example) that is loaded with this battery unit is not illustrated in particular. However, this battery unit is installed at a section that has space to spare comparatively, for example at a step of a passenger or under (inside) a seat. And, it is connected to a motor for driving a wheel via a controller or the like.

Now, as seen from FIG. 1, as main constitution elements, the battery unit in which this cooling structure is adopted has battery cases 1 and 2 of rectangular boxes piled in up and down two steps. Also, on a side of one end surface of a piled body consisting of these battery cases 1 and 2, a duct 3 for introducing open air is attached thereto.

On the other hand, on a side of the other end surface of the piled body consisting of the battery cases 1 and 2, turn ducts 4a–4f generally in the shape of a letter C are attached thereto. In addition, on a surface in the piled body consisting of the above-described battery cases 1 and 2, to which the duct 3 for introducing open air is attached, a terminal for taking out electric energy accumulated in the battery is placed. However, in FIG. 1, this is omitted.

Next, the respective structures of the above-described constitution elements will be explained in detail.

First, the battery case 1 will be explained. In addition, with regard to the battery case 2, since it has a structure same as this battery case 1, its explanation will be omitted. However, in this specifications, with regard to the constitution elements belonging to the battery case 2, "'" is attached to codes thereof, and thereby, they are distinguished from the constitution elements belonging to the battery case 1.

A main structure section (shell body) of the battery case 1 is constructed by using heat resistance and shock resistance plastic or the like, and has sufficient insulation efficiency. Incidentally, as such plastic having heat resistance and shock resistance, there are polyurethane resin, polypropylene resin or the like, for example.

Within the battery case 1, a battery is accommodated. More particularly, as seen from FIG. 2 and FIG. 3, within this battery case 1, battery elements (referred to as a module, hereinafter) M in which total six cells C are connected to each other in series are placed in up and down two steps. And, total five pairs of modules consisting of these up and down two modules M are placed in parallel condition (However, the pairs of modules are electrically connected to each other in series.). In other words, within the battery case 1, total 10 (2 steps×5 columns) modules M are accommodated, and accordingly, within the battery case 1, total sixty (6×2 steps×5 columns) cells C exist.

More particularly, as shown in FIG. 4, on a side of one surface (a surface to which the duct 3 for introducing open air is attached) of the battery case 1, the modules M adjacent to each other are connected to each other by using a terminal plate 5 generally in the shape of a letter ⊃ in Japanese. Especially, this terminal plate 5 exists outside the battery case 1, and is fastened with a bolt and fixed to an electrode terminal of the module M. On the other hand, as shown in FIG. 5, on a side of the other surface of the battery case 1, the modules M piled up and down are connected to each other by using a straight terminal plate 6. In addition, also with regard to this surface side, the above-described terminal plate 6 exists outside the battery case 1. And, the terminal plate 6 is fastened with a bolt and fixed to an electrode terminal of the module M. As a result, as mentioned above, all modules M within the battery case 1 are in condition that they are electrically connected to each other in series.

Here, for reference, a voltage generated by one of the above-described cells C is 1.2 V. And, since all of these cells C are connected to each other in series, a voltage generated by the battery case 1 becomes 72 V as a whole.

Now, as seen from FIG. 6 or the like, the above-described modules M are supported by partition plates 7 within the battery case 1. To be exact, a pair of modules M piled up and down is supported by one partition plate 7 at predetermined intervals. Incidentally, the actual shape of this partition plate 7 is a frame in which notches corresponding to the modules M are formed. And, although it will be described later in detail, the pairs of modules M piled up and down and the partition plates 7 supporting them cooperatively partition the inside of the battery case 1 into total six spaces 8a–8f. Each of these partitioned spaces 8a–8f is a flow path for introduced open air for cooling the modules M.

Next, on the side surfaces of the battery case 1, namely, on the surfaces to which the above-described duct 3 for introducing open air and the above-described turn ducts 4a–4f are attached, a plurality of openings are formed in accordance with the above-described respective partitioned spaces 8a–8f.

More particularly, first, on the surface in which the duct 3 for introducing open air is provided, openings 9a–9f are formed. On the other hand, also on the surface in which the turn ducts 4a–4f are provided, openings 10a–10f having a shape same as the openings 9a–9f are formed. In addition, also with regard to the battery case 2 positioned below the battery case 1, openings 9a'–9f ' and openings 10a'–10f' same as those openings are formed.

The turn ducts 4a–4f that constitute the battery unit together with the battery cases 1 and 2 are for connecting the above-described openings 10a–10f to the above-described openings 10a'–10f'. In other words, the turn ducts 4a–4f fill the role of inducing introduced open air into the battery case 2 from the inside of the battery case 1 or into the battery case 1 from the inside of the battery case 2.

More particularly, the turn duct 4a connects the opening 10a to the opening 10a'. Also, the turn duct 4b connects the opening 10b to the opening 10b'. Also, the turn duct 4c connects the opening 10c to the opening 10c'. Also, the turn duct 4d connects the opening 10d to the opening 10d'. Also, the turn duct 4e connects the opening 10e to the opening 10e'. And, finally, the turn duct 4f connects the opening 10f to the opening 10f'.

With regard to the duct 3 for introducing open air, which is a constitution element of the above-described battery unit, similar to the turn ducts 4a–4f, this duct 3 for introducing open air has an arrangement in which branch sections 12a–12f are alternately provided to a main body section 11 in the shape of a pipe. And, these branch sections 12a–12f are connected to any one of the above-described openings 9a–9f and the above-described openings 9a'–9f'.

More particularly, the branch section 12a is connected to the opening 9a'. Also, the branch section 12b is connected to the opening 9b. Also, the branch section 12c is connected to the opening 9c'. Also, the branch section 12d is connected to the opening 9d. Also, the branch section 12e is connected to the opening 9e'. And, finally, the branch section 12f is connected to the opening 9f. Accordingly, first, the open air sent into the main body section 11 branches at the branch sections 12a–12f. And, the open air is introduced into the partitioned spaces 8a', 8b, 8c', 8d, 8e' and 8f from the openings 9a', 9b, 9c', 9d, 9e' and 9f, respectively.

In addition, although it will be explained later again, the above-described openings 9a', 9b, 9c', 9d, 9e' and 9f correspond to a first introduction opening in this cooling structure. On the other hand, the above-described openings 9a, 9b', 9c, 9d', 9e and 9f' correspond to a second discharge opening in this cooling structure. However, these openings 9a, 9b', 9c, 9d', 9e and 9f' are in condition that they are open.

The above-described duct 3 for introducing open air includes means for sending open air under pressure (a motor fan) 13. In other words, this embodiment has an arrangement in which, by this means 13 for sending open air under pressure, open air can be compulsorily sent into the battery cases 1 and 2. More particularly, the main body section 11 of the above-described duct 3 for introducing open air is a truncated cone in shape, cross section of which becomes smaller toward its inner part. Accordingly, values of the open air flowing into the respective branch sections 12a–12f become desired ones. For reference, values of the open air flowing into the branch sections 12a and 12f are about a half of values of the open air flowing into other branch sections 12b, 12c, 12d and 12e.

In addition, the above-described duct 3 for introducing open air is not necessarily a truncated cone in shape. Other than such a shape, for example a rectangular parallelepiped shape, namely, a box shape in which transverse cross sections are equal to each other at all places can be used.

Also, similar to the above-described battery cases 1 and 2, this duct 3 for introducing open air is also constructed of plastic having superior heat insulation, although that can be applied to the turn ducts 4a–4f explained before.

Now, as mentioned above, this cooling structure adopted in the above-described battery unit is for cooling the plurality of modules (battery elements) M by means of open air, which are accommodated in the battery cases 1 and 2. Below, the arrangement and operation thereof will be explained in detail (Refer to FIG. 7–FIG. 9.)

This cooling structure includes a plurality of unit cooling systems. In other words, total five unit cooling systems are provided in accordance with the respective combinations of the pair of modules M piled up and down within the battery case 1 and the pair of modules M' piled up and down within the battery case 2.

As one of these unit cooling systems, first, there is a system that exists at a position closest to the opening of the duct 3 for introducing open air, and that cools the combination of the pair of modules piled up and down. Hereinafter, this unit cooling system is referred to a "first cooling system". Hereinafter, the systems other than that are referred to as a second cooling system, a third cooling system, a fourth cooling system and a fifth cooling system that are closer to this first cooling system in that order.

Now, the above-described first cooling system includes the partitioned spaces (the first space) 8a and 8a', the partitioned spaces (the second space) 8b and 8b', and the turn ducts 4a and 4b. And, first, the open air introduced into the partitioned space 8a' from the opening (the first introduction opening) 9a' enters the partitioned space 8a through the turn duct 4a, and finally, is discharged from the opening (the second discharge opening) 9a. On the other hand, the open air introduced into the partitioned space 8b from the opening (the first introduction opening) 9b enters the partitioned space 8b' through the turn duct 4b, and finally, is discharged from the opening (the second discharge opening) 9b'.

With regard to other cooling systems, their basic structures and operations are the same. For example, the second cooling system includes the partitioned spaces (the second space) 8b and 8b', the partitioned spaces (the first space) 8c and 8c', and the turn ducts 4b and 4c. And, first, the open air introduced into the partitioned space 8b from the opening (the first introduction opening) 9b enters the partitioned space 8b' through the turn duct 4b, and finally, is discharged from the opening (the second discharge opening) 9b'. On the other hand, the open air introduced into the partitioned space 8c' from the opening (the first introduction opening) 9c' enters the partitioned space 8c through the turn duct 4c, and finally, is discharged from the opening (the second discharge opening) 9c.

In addition, as understood from the descriptions so far, the unit cooling systems adjacent to each other share the first space or the second space. This is because, in the space shared by the unit cooling systems adjacent to each other, flow directions of the introduced open air are the same as each other.

Generally speaking, in this embodiment, in order to obtain the above-described first cooling system for example, the space within the battery cases 1 and 2 is partitioned into the first space and the second space adjacent to each other and interposing the pair of modules M therebetween. And, after the open air introduced into the first space 8a' from the first introduction opening (the opening) 9a' corresponding to one end side of the module M has passed the inside of this first space 8a', it is discharged from the first discharge opening (the opening) 10a' corresponding to the other end side of the module M. Further, the introduced open air discharged from this first discharge opening 10a' enters the first space 8a through the turn duct 4a for connecting the first discharge opening 10a' to the second introduction opening (the opening) 10a. And, finally, the introduced open air is discharged from the second discharge opening (the opening) 9a.

On the other hand, after the open air introduced into the second space 8b from the first introduction opening (the opening) 9b corresponding to one end side of the module M has passed the inside of this second space 8b, it is discharged from the first discharge opening (the opening) 10b corresponding to the other end side of the module M. Further, the introduced open air discharged from this first discharge opening 10b enters the second space 8b' through the turn duct 4b for connecting the first discharge opening 10b to the second introduction opening (the opening) 10b'. And, finally, the introduced open air is discharged from the second discharge opening (the opening) 9b'.

In the cooling structure constructed in this manner, the open air is introduced into the first space and the second space adjacent to each other and interposing the module M therebetween in directions opposite to each other, respectively. And, while cooling the module M, this introduced open air is gradually warmed up, and finally, is discharged in directions opposite to each other. By the way, between a flow distance of the open air introduced into the battery case 1 or the battery case 2 and a temperature of the introduced open air at a position corresponding to the flow distance, basically a linear relationship, namely, a direct proportional relationship is established. In other words, a temperature gradient along a flow path (including the inside of the turn ducts 4a–4f) of the introduced open air is almost constant. And, these temperature gradients are completely reversed inside the first space and inside the second space. Accordingly, a total value of heat that is cooperatively absorbed by the open air introduced in directions opposite to each other from a part of the module M is always constant regardless of a distance from the open air introduction opening. Therefore, for the module M constructed by connecting a plurality of cells C to each other in series, a temperature difference does not occur especially between the cells C.

In other words, by adopting this cooling structure, it is possible to cool the module M, and then a battery that is an assembly thereof efficiently so as to make the temperature of the whole thereof uniform. As a result, the task of the performance reduction of the battery due to the temperature difference does not occur.

In addition, although, in the above-described first embodiment, a case where the two battery cases are used was raised as an example, of course the present invention is not limited to such an embodiment. For example, even in case that only one battery case is used or more than or equal to three battery cases are used, an appropriate change within the scope of its technical idea is added, and thereby, it is possible to adopt the battery cooling structure of the present invention.

Next, a second embodiment of the present invention will be explained by using FIG. 10 and FIG. 11.

Figure 10:
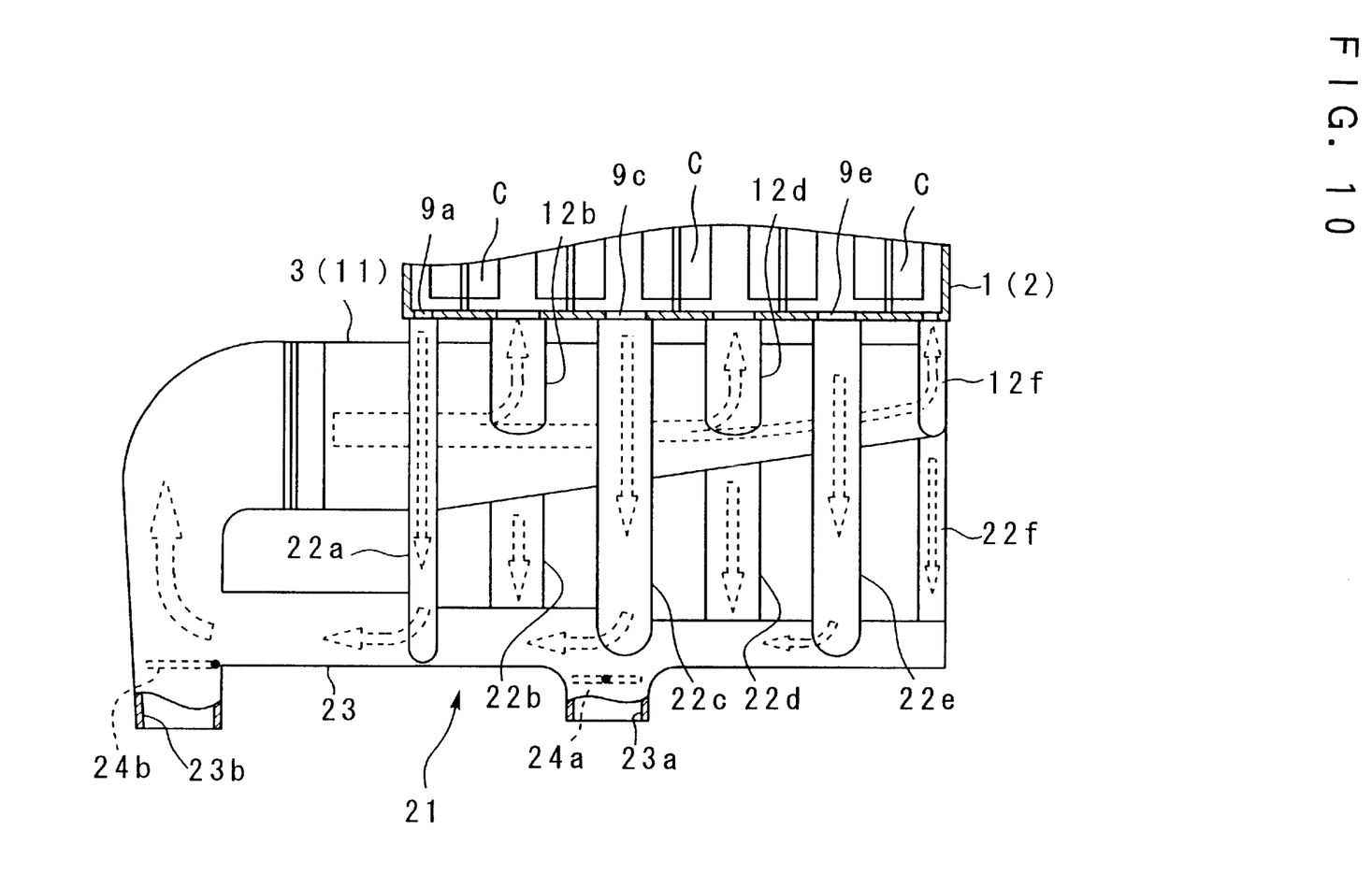
FIG. 10 is an essential plane view of a battery unit in which a cooling structure related to a second embodiment of the present invention is adopted.
Figure 11:
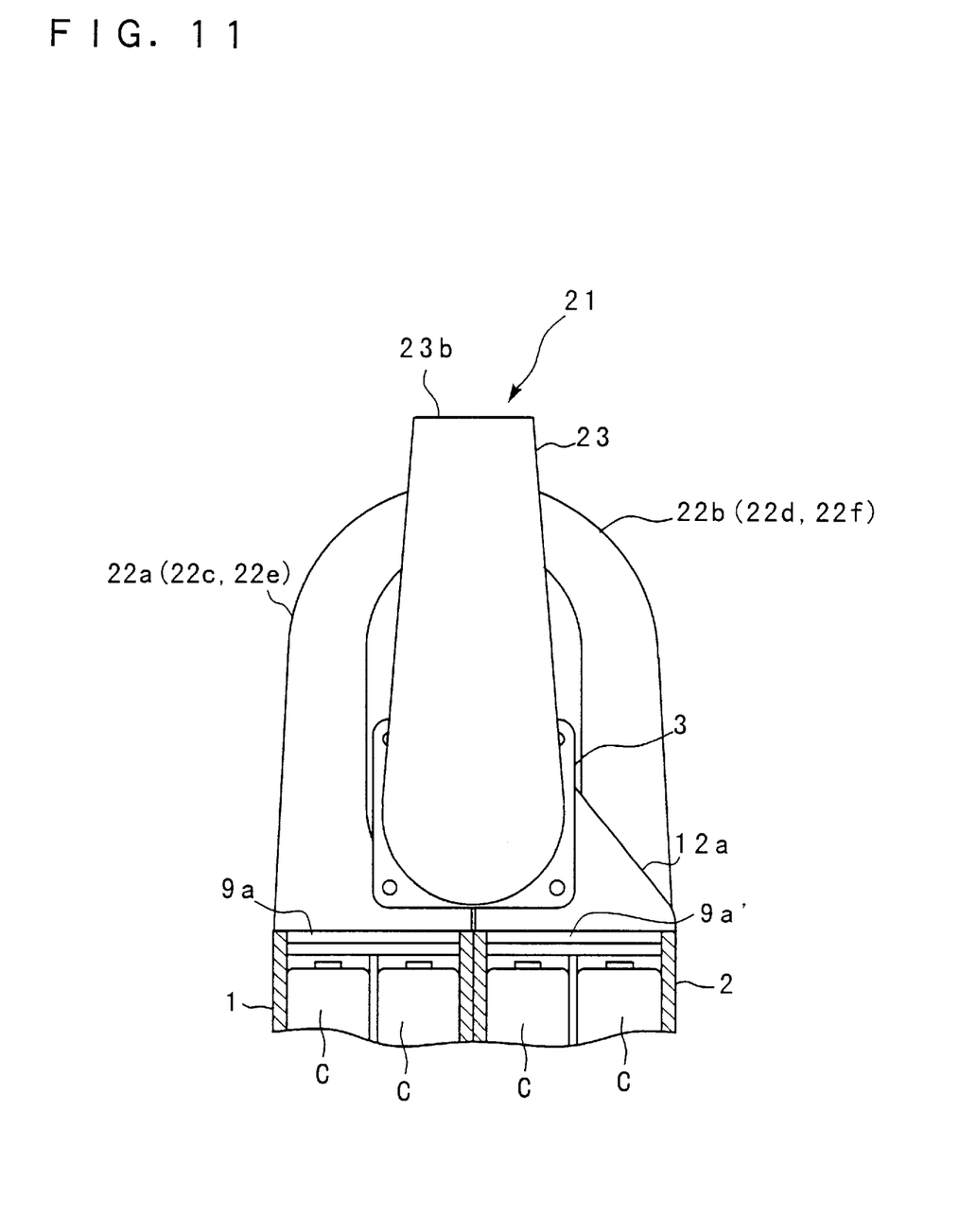
FIG. 11 is an essential front view of the battery unit in which a cooling structure related to a second embodiment of the present invention is adopted.

In addition, FIG. 10 is an essential plane view of a battery unit in which a cooling structure related to this embodiment is adopted, and FIG. 11 is an essential front view of the battery unit in which a cooling structure related to this embodiment is adopted.

However, in FIG. 10 and FIG. 11, similar to the previous first embodiment, a roof plate and a front plate of the case are omitted. Also, in this embodiment, its basic technical idea is the same as that of the above-described first embodiment. Accordingly, explanation below will be focused on points different from this first embodiment. In addition, with regard to members having a shape and a function same as those explained in connection with the first embodiment, codes same as those being already used are attached thereto, and the explanation thereof will be omitted.

The battery cooling structure (referred to as this cooling structure again, hereinafter) in accordance with this embodiment effects large advantages especially during cold (under situation where the batteries are cooled).

As seen from FIG. 10 and FIG. 11, in this cooling structure, an end section opening on a side where open air in the duct 3 for introducing open air is introduced is connected to openings (second discharge openings) 9a, 9b', 9c, 9d', 9e and 9f (a part of them is not shown. Denoted as 9a–9f, hereinafter) formed in the battery cases 1 and 2 by means of a tube body 21 for circulation, which has a specific shape.

This tube body 21 for circulation can eject discharged air from the above-described openings 9a–9f to the atmosphere if necessary. And, instead of this, it is constructed so as to supply fresh open air to the duct 3 for introducing open air.

More particularly, as main constitution elements, the above-described tube body 21 for circulation has branch tube sections 22a–22f, one end side of which is connected to the above-described openings 9a–9f, respectively, and a main tube section 23 generally in the shape of a letter L, to which the other end side of these branch tube sections 22a–22f are connected (integrally connected). In addition, one end side of this main tube section 23 is connected to the end section opening on a side where the open air in the above-described duct 3 for introducing open air is introduced.

Out of the above-described constitution elements, the main tube section 23 has opening sections 23a and 23b. In addition, as mentioned later, the opening section 23a is used for ejecting discharged air from the above-described openings 9a–9f to the atmosphere. On the other hand, the opening section 23b is used for supplying fresh open air to the duct 3 for introducing open air.

More particularly, in these opening section 23a and opening section 23b, movable shielding plate 24a and shielding plate 24b are placed, respectively (Their driving mechanisms are not shown). In other words, in this cooling structure, the opening sections 23a and 23b can be blocked if necessary. However, as for the shielding plate 24b, when it does not block the opening section 23b, it fills the role of blocking a flow path within the main tube section 23.

Now, as known well, batteries accommodated in the battery cases 1 and 2 cannot exhibit their desired performance if their temperatures are too low. Accordingly, in using them, it is desirable that the temperatures of the batteries rapidly increase to an optimum value.

In case of adopting this cooling structure, under such a situation, first, by using the shielding plate 24a and the shielding plate 24b, the opening sections 23a and 23b of the main tube section 23 are blocked (condition shown in FIG. 10). And, thereby, the discharged air from the above-described openings (the second discharge openings) 9a–9f may be supplied to the duct 3 for introducing open air. In other words, the discharged air may be circulated (a flow of the circulating discharged air is shown by arrows of a broken line in FIG. 10). Then, since the temperature of the discharged air from the above-described openings (the second discharge openings) 9a–9f is considerably higher than the atmosphere, it is possible to make the temperatures of the batteries increase rapidly rather than introduction of fresh open air into the duct 3 for introducing open air.

Especially in this cooling structure, it is possible to make the temperatures of the batteries increase rapidly without generating a temperature difference between the cells C constituting the batteries (This is the reverse of the advantage explained in the above-described first embodiment.). As a result, it becomes possible to make the batteries exhibit desired performance rapidly.

After the batteries reach the optimum temperature in this manner, the shielding plate 24a is rotated around its center section by 90° from a position of FIG. 10, and the opening section 23a is opened. On the other hand, with regard to the shielding plate 24b, it is rotated around its right end section by 90° clockwise, and the opening section 23b is opened. In addition, thereby, at the same time, a flow path within the main tube section 23 is blocked. In other words, the flow path within the main tube section 23 is broken. Then, the discharged air from the above-described openings (the second discharge openings) 9a–9f is ejected to the atmosphere through the opening section 23a, and instead of this, low temperature fresh open air is supplied to the duct 3 for introducing open air from the opening section 23b. In other words, after the batteries reach the optimum temperature, the battery unit in which this cooling structure is adopted also functions like that in the above-described first embodiment.

However, the shape (the number and positions of the opening sections in particular) of the above-described tube body 21 for circulation is not limited to that of this embodiment. Of course, it can be performed by suitably adding a change within the scope of a technical idea of the present invention. Also, for blocking the opening sections of the tube body 21 for circulation, the above-described shielding plates need not be always used, and other technique can be suitably adopted.

Figure 12:
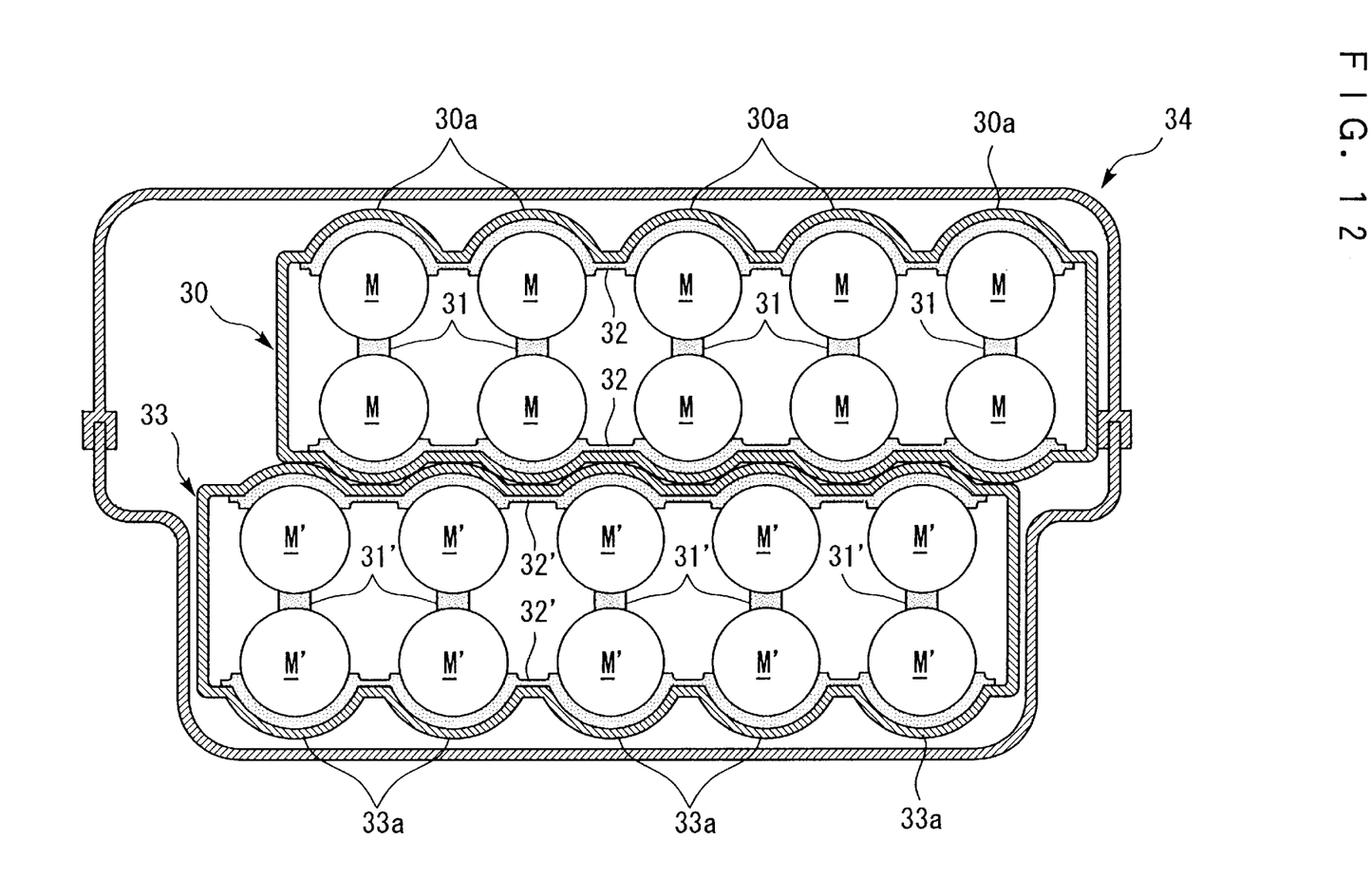
FIG. 12 is a transverse cross sectional view of a battery unit in which a cooling structure related to a third embodiment of the present invention is adopted.

Next, a third embodiment of the present invention will be particularly explained by using FIG. 12.

In addition, FIG. 12 is a transverse cross sectional view of a battery unit in which a cooling structure related to this embodiment is adopted. However, also in this embodiment, its basic technical idea is the same as that of the above-described first embodiment. Accordingly, explanation below will be focused on points different from the above-described first embodiment. In addition, with regard to members having a shape and a function same as those in the embodiments explained before, codes same as those being already used are attached thereto, and the explanation thereof will be omitted.

The objective of the battery cooling structure (referred to as this cooling structure again, hereinafter) in accordance with this embodiment is especially to reduce the number of components and an assembly load, and to reduce dimensions of the unit, especially a height dimension thereof.

As seen from FIG. 12, in this cooling structure, for a partition of space within a case 30, a spacer 31, and a pair of modules M (battery elements) piled up and down via this spacer 31 are used. In addition, the spacer 31 is constructed of rubber, sponge or the like.

More particularly, in this embodiment, a spacer 32 made of rubber or made of sponge is also interposed between the module M and an inner surface of a case 1. However, this spacer 32 has a longer dimension so as to come into contact with all modules M lying in a transverse direction. Also, two spacers 32 are placed in a longitudinal direction of the modules M (in a depth direction of the case 1).

This is also applied to a side of a case 33. In other words, also on a side of the case 33, for a partition of its internal space, a spacer 31', and a pair of modules M' (battery elements) piled up and down via this spacer 31' are used. In addition, the spacer 31' is also constructed of rubber, sponge or the like.

In addition, a spacer 32' having a longer dimension, which is made of rubber or made of sponge, is also interposed between the module M' and an inner surface of a case 2. However, two spacers 32' are also placed in a longitudinal direction of the modules M' (in a depth direction of the case 1).

Accordingly, the module M is supported within the case 30 under condition that it is interposed between an inner surface of the case 30 and the spacer 31 via the spacer 32. On the other hand, the module M' is supported within the case 33 under condition that it is interposed between an inner surface of the case 33 and the spacer 31' via the spacer 32'.

On up and down outer surfaces of the above-described case 30, convex sections 30a having a cross section in the shape of a circular arc are formed for receiving a part of the modules M placed within the same case 30. Also, on up and down outer surfaces of the above-described case 33, convex section 33a having a cross section in the shape of a circular arc are formed for receiving a part of the modules M' placed within the same case 33. Accordingly, the above-described spacer 32 and spacer 32' are arranged by connecting a plurality of circular arc parts to each other in a line.

Now, the above-described case 30 and case 33 are piled up and down so that convex sections formed on the other side thereof are positioned within concave sections between convex sections formed on one side thereof. More particularly, in the concave sections between the convex sections 30a of the case 30, the convex sections 33a of the case 33 are received. On the other hand, in the concave sections between the convex sections 33a of the case 33, the convex sections 30a of the case 30 are received. In other words, the case 30 and the case 33 are under condition that they are engaged with each other.

In this embodiment, under such condition, the case 30 and the case 33 are accommodated within an outer case 34. In addition, this outer case 34 is consisting of an upper half body corresponding to the case 30 and a lower half body corresponding to the case 33, and is joined to each other separably up and down by means of insertion.

In case of adopting the above-described structure, the pair of modules M (or modules M') piled up and down, and the spacer 31 (or the spacer 31') interposed therebetween fill the role of a so-called partition. Accordingly, in this cooling structure, gaps (spaces) adjacent this partition become flow paths of introduced open air for cooling.

Now, in the battery cooling structure related to this embodiment, the flow paths of introduced open air can be formed without using a partition plate. Accordingly, as mentioned above, it is possible to reduce the number of components and an assembly load. And, as a result, it is possible to further promote cost reduction. Also, by adopting this cooling structure, it is possible to save dimensions of a piled body obtained by piling the case 30 and the case 33 up and down, especially a height dimension thereof. This largely contributes to making the battery unit more compact.

In addition, by adopting this cooling structure, positional stability of the modules M and M' within the cases 30 and 33 is drastically improved.

However, in case of adopting this cooling structure, a turn duct (not shown) for connecting the case 30 to the case 30 slightly slants with respect to a center line of the outer case 34.

What is claimed is:

1. A battery cooling structure for cooling a battery by open air, which is accommodated within a case, characterized in that the structure has:

said case;

first space and second space formed by partitioning space within said case, and adjacent to each other and interposing said battery therebetween;

a first introduction opening formed on a surface of said case, which is corresponding to a side of one end of said battery;

a first discharge opening formed on a surface of said case, which is corresponding to a side of the other end of said battery, for discharging said open air introduced into said first space from said first introduction opening after said open air has passed an inside of said first space;

a second introduction opening formed on a surface of said case, which is corresponding to a side of the other end of said battery; and a second discharge opening formed on a surface of said case, which is corresponding to a side of one end of said battery, for discharging said open air introduced into said second space from said second introduction opening after said open air has passed an inside of said second space, and a plurality of said batteries are accommodated in said cases in parallel condition, and a plurality of unit cooling systems consisting of said first space and said second space adjacent to each other and interposing said batteries therebetween are provided in said cases, and further, said adjacent unit cooling systems are constructed so as to mutually share said first space or said second space.

2. A battery cooling structure recited in claim 1, characterized in that the structure has two of said case, and by making said cases adjacent to each other, and further, connecting said first discharge opening in one of said cases to said second introduction opening in the other of said cases, and by connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases.

3. A battery cooling structure recited in claim 1, characterized in that the structure further has a partition plate, and said partition plate is used together with said battery for a partition of the space within said case, and further said partition plate is constructed so as to support said battery.

4. A battery cooling structure recited in claim 2, characterized in that, on upper and lower outer surfaces of said cases, convex sections for receiving a part of said battery to be placed within said cases are formed, and said cases are piled up and down so that said convex sections formed on a side of the other of said cases are positioned within a concave section between said convex sections formed on a side of one of said cases.

5. A battery cooling structure recited in claim 1, characterized in that the structure further has a duct in which means for sending open air under pressure is provided, and said first introduction opening is connected to said duct, and an end section opening on a side where open air is introduced in said duct, and said second discharge opening formed in said case are connected to each other by a tube body for circulation, and said tube body for circulation is constructed so as to, if necessary, eject discharged air from said second discharge opening into the atmosphere and supply open air to said duct.

6. A battery cooling structure for cooling a battery by open air, which is accommodated within a case, characterized in that space within said case is partitioned into first space and second space adjacent to each other and interposing said battery therebetween, and the structure is constructed so that open air introduced into said first space from a first introduction opening formed on a surface of said case, which is corresponding to a side of one end of said battery, is discharged from a first discharge opening formed on a surface of said case, which is corresponding to a side of the other end of said battery, after the open air has passed an inside of said first space, and open air introduced into said second space from a second introduction opening formed on a surface of said case, which is corresponding to a side of the other end of said battery, is discharged from a second discharge opening formed on a surface of said case, which is corresponding to a side of one end of said battery, after the open air has passed an inside of said second space, and further, a plurality of said batteries are accommodated in said cases in parallel condition, and a plurality of unit cooling systems consisting of said first space and said second space adjacent to each other and interposing said batteries therebetween are provided in said cases, and further, said adjacent unit cooling systems are constructed so as to mutually share said first space or said second space.

7. A battery cooling structure recited in claim 6, characterized in that the structure has two of said case, and by making said cases adjacent to each other, and further, connecting said first discharge opening in one of said cases to said second introduction opening in the other of said cases, and by connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases.

8. A battery cooling structure recited in claim 6, characterized in that the structure further has a partition plate, and said partition plate is used together with said battery for a partition of the space within said case, and further said partition plate is constructed so as to support said battery.

9. A battery cooling structure recited in claim 7, characterized in that, on upper and lower outer surfaces of said cases, convex sections for receiving a part of said battery to be placed within said cases are formed, and said cases are piled up and down so that said convex sections formed on a side of the other of said cases are positioned within a concave section between said convex sections formed on a side of one of said cases.

10. A battery cooling structure recited in claim 6, characterized in that the structure further has a duct in which means for sending open air under pressure is provided, and said first introduction opening is connected to said duct, and an end section opening on a side where open air is introduced in said duct, and said second discharge opening formed in said case are connected to each other by a tube body for circulation, and said tube body for circulation is constructed so as to, if necessary, eject discharged air from said second discharge opening into the atmosphere and supply open air to said duct.

11. A battery cooling structure for cooling a battery by open air, which is accommodated within a case and constructed by connecting a plurality of cells to each other in series, characterized in that the structure has:

said case;

first space and second space formed by partitioning space within said case, and adjacent to each other and interposing said battery therebetween;

a first introduction opening formed on a surface of said case, which is corresponding to a side of one end of said battery;

a first discharge opening formed on a surface of said case, which is corresponding to a side of the other end of said battery, for discharging said open air introduced into said first space from said first introduction opening after said open air has passed an inside of said first space;

a second introduction opening formed on a surface of said case, which is corresponding to a side of the other end of said battery; and a second discharge opening formed on a surface of said case, which is corresponding to a side of one end of said battery, for discharging said open air introduced into said second space from said second introduction opening after said open air has passed an inside of said second space, and there are two of said case with the cases adjacent to each other, and further, by connecting said first discharge opening in one of said cases to said second introduction opening in the other of said cases, and connecting said first discharge opening in the other of said cases to said second introduction opening in one of said cases, the structure is constructed so that the open air introduced from said first introduction opening in one of said cases is discharged from said second discharge opening in the other of said cases, and the open air introduced from said first introduction opening in the other of said cases is discharged from said second discharge opening in one of said cases, and a plurality of said batteries are accommodated in said cases in parallel condition, and a plurality of unit cooling systems consisting of said first space and said second space adjacent to each other and interposing said batteries therebetween are provided in said cases, and said adjacent unit cooling systems are constructed so as to mutually share said first space or said second space, and further, a spacer, and a pair of said batteries piled up and down via said spacer are used in a partition of the space within said cases, and said batteries are supported within said cases with the batteries interposed between inner surfaces of said cases and said spacer, and on upper and lower outer surfaces of said cases, convex sections for receiving a part of said batteries to be placed within said cases are formed, and said cases are piled up and down so that said convex sections formed on a side of the other of said cases are positioned within a concave section between said convex sections formed on a side of one of said cases.

* * * * *

UNITED STATES PATENT AND TRADEMARK OFFICE
CERTIFICATE OF CORRECTION

PATENT NO. : 6,613,472 B1  Page 1 of 1
DATED : September 2, 2003
INVENTOR(S) : Watanabe It is certified that error appears in the above-identified patent and that said Letters Patent is hereby corrected as shown below:

<u>Title page,</u>
Item [*] Notice, delete "by 0" and insert -- by 50 days --.

Signed and Sealed this

Second Day of May, 2006

JON W. DUDAS
*Director of the United States Patent and Trademark Office*